3891X
W. E. DAVISON.
Hemp Brake.
Patented June 22, 1824.
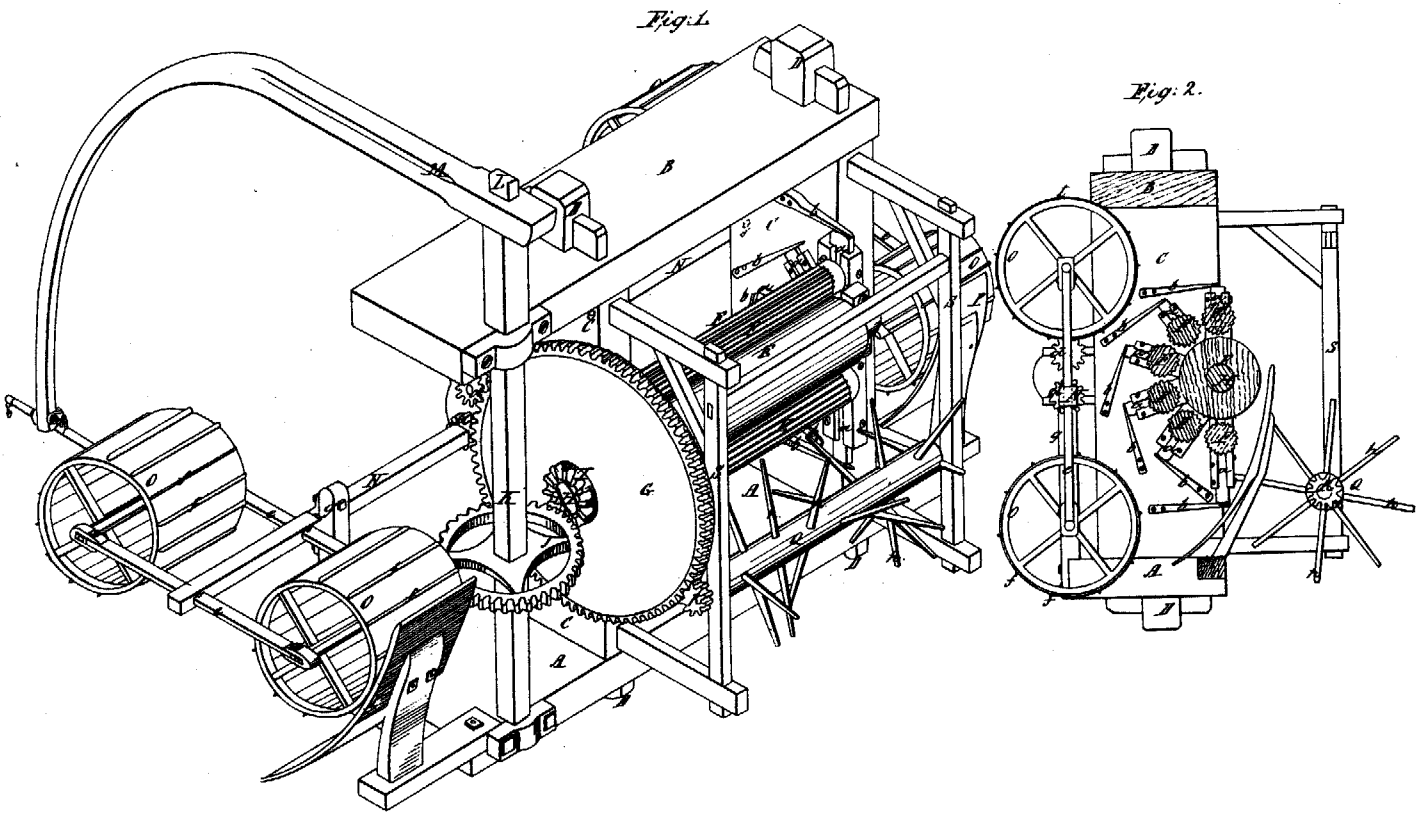
N. PETERS, Photo-Lithographer, Washington, D. C.

3891X

UNITED STATES PATENT OFFICE.

WILLIAM C. DAVISON.

IMPROVEMENT IN MACHINES FOR BREAKING AND SWINGLING FLAX AND HEMP AND FOR THRASHING GRAIN.

Specification forming part of Letters Patent dated June 22, 1824.

*To all whom it may concern:*

Be it known that I, WILLIAM C. DAVISON, have invented an Improvement in Machines for Breaking and Swingling Flax and Hemp and for Thrashing Grain, of which the following is a specification.

I make a strong upright frame, of oak or other hard wood, put together by means of tenons and mortises, the bottom or platform to be eight feet long, six inches thick, and two feet two inches wide; the top seven feet long, six inches thick, and twenty-two wide; the upright posts or side pieces the same width and thickness of the top and five feet long from shoulder to shoulder. These are on the ends of the two pieces or tenons, which run through the top and bottom and keyed fast, so as to hold the frame together. In these two pieces are set seven cylinders or rollers, one of fourteen inches diameter and three feet six inches long. On one end of this cylinder is a gudgeon four inches long and four in diameter. On the other end is a neck or gudgeon six inches in diameter and thirteen inches long, which passes through the end of the upright pieces where the horizontal shaft stands. There are six other cylinders placed in a circular form round the above-mentioned fourteen-inch cylinders, so as to revolve without touching each other, the same length of it and six inches diameter. These are all to be fluted on a square, so as to become sharp at the point. These cylinders are to lie horizontally. These are to be placed in sliding blocks or bridges to apply to springs placed in the upright pieces which confine the cylinders. These springs are to be made of oak or other hard wood suitable for the purpose, and one foot long and two inches thick at one end and three-fourths inch at the other. These springs are made to give when a handful of flax is put in the machine. On the end of the smaller cylinder are gudgeons three inches diameter and two long to be set in the sliding block, these blocks or bridges to be four inches wide, two inches thick, and seven long. There is to be placed on the neck of the cylinder which passes through the upright piece, a wheel four feet in diameter, made of hard plank three inches thick. Round this wheel is to be placed a band of casting with cogs or teeth about one inch from center to center of said cogs or teeth; the band to be about one inch thick and two wide and fastened on said wheel. There is another wheel of ten-inches diameter on the neck of said large cylinder, with cogs or teeth, say one and a half inch from center to center. This wheel is to be intersected with a horizontal wheel of twenty-seven-inches diameter, with cogs the same as the before-mentioned ten-inch wheel. This wheel is to be placed on an upright shaft standing at the end of the neck of the large cylinder. On the end which passes into the bottom is a gudgeon four inches diameter; the neck which passes through the top, nine inches diameter. On the top of this shaft is a tenon, which passes into a lever, say ten feet long, from the center of said shaft made crooked, so as to come within three feet of the bottom. To this is to be attached horses or other cattle to propel it.

The flax or hemp is to be put in between at the top and center cylinders, and goes round the center between it and the small ones and comes out at the bottom on the same side. There are two swingle-wheels which are carried by the above-mentioned four-foot wheel. The shafts are placed on the back part of the machine, with cast wheels on one end five inches in diameter to intersect the four-foot wheel. The swingling-wheels run one on each end of said machine. The shafts are to lie horizontally. The shaft of one is to be six feet and a half long. The other is five feet. In these shafts are two arms or braces which pass through to be four feet long. On the ends of these are swingling-wheels two feet long placed horizontally. These wheels run in a curve or quarter-circle made to spring to and from the knives at the ends of these shafts, where the swingling-wheels are supports for them to rest and run in. In swingling the flax and hemp has to be held in the hand. There is in front of said machine a cylinder three and a half feet long and six inches in diameter; the gudgeon on one end three inches in diameter and four long. The other end is a gudgeon or neck eight inches long and three in diameter. This cylinder is placed in a frame with tenons at the bottom to stand in the bottom of said machine; at the top is to be fastened with screw or keys. On the neck of cylinder is a wheel six inches in diameter to intersect the above-mentioned four-foot wheel. In this cylinder are placed spikes or pins of iron or wood diagonally round it—say ten to twelve inches long, about an inch in diameter. This part of the machine is to be taken off while dressing flax and hemp. While thrashing grain the swingling part is to be stopped. The grain is put into the machine the same way the flax and hemp are. The cylinder in front is to be clear, the berry of the grain from the straw.

The above-described machine can be propelled by manual, horse, water, or any other known power.

WILLIAM C. DAVISON.

Witnesses:
WILLIAM ELLIOT,
WM. P. ELLIOT.